United States Patent Office 3,236,598
Patented Feb. 22, 1966

---

3,236,598
PROCESSES FOR THE PRODUCTION OF DIBORANE
Friedrich Schubert, Neuried, near Munich, Elmar-Manfred Horn, Aachen, and Konrad Lang, Leverkusen, Germany, assignors to Farbenfabriken Bayer Aktiengesellschaft, Leverkusen, Germany, a corporation of Germany
No Drawing. Filed June 20, 1962, Ser. No. 203,741
Claims priority, application Germany, July 7, 1961, F 34,380
9 Claims. (Cl. 23—204)

Diborane is known to be an especially suitable compound for the production of a large number of boron compounds, such as higher, if desired alkylated, boranes and for the hydroboration of non-saturated organic substances.

For the production of diborane a series of processes are mentioned in chemical literature, such as for example the reaction of boron trioxide or metal borates with hydrogen in the presence of a suitable metal at pressures of for example 800 atmospheres and temperatures of, for example, 190° C. On the other hand, the processes for the production of diborane using the hydrides, metal borohydrides, alumohydrides or amine boranes as starting substances take place under substantially milder conditions of pressure and temperature.

The object of the invention is to provide a process for the production of diborane characterised by reacting metal borohydrides with fluoroboric acid alkyl esters.

In the case of sodium borohydride on the one side and difluoroboric acid-n-propyl ester on the other the process according to the invention can be represented by the following Equation 1:

(1) $3NaBH_4 + 6F_2BO\text{-}n\text{-}C_3H_7 \rightarrow 2B_2H_6$
$\phantom{(1)\ 3NaBH_4 + 6F_2BO\text{-}n\text{-}C_3H_7 \rightarrow}+ 2B(O\text{-}n\text{-}C_3H_7)_3 + 3NaBF_4$ The process according to the invention can furthermore be coupled with known methods for the production of borohydrides. Especially useful, in this respect, appears the combination with the well-known method in which, for example, according to Equations 2 or 3

(2) $8NaH + 3F_2BOC_4H_9 \rightarrow 2NaBH_4 + 6NaF + B(OC_4H_9)_3$ (3) $4NaH + F_2BOC_4H_9 \rightarrow NaBH_4 + 3NaF + NaOC_4H_9$ borohydrdes are produced from metal hydrides and fluoroboric acid esters. Because of economic considerations alkali metal borohydrides, particularly sodium borohydride, are preferred if metal borohydrides are used as starting substances, however, other metal borohydrides selected from the group consisting of the alkaline earth metals, particularly calcium borohydride are also applicable in the reaction.

The fluoroboric acid esters used in the process according to the invention correspond to the general formula $$F_nB(OR)_{3-n}$$

wherein R represents an alkyl radical and $n$ equals 1 or 2. The particularly stable difluoroboric acid esters $$F_2BOR$$

and among them again the lower difluoroboric acid alkyl esters, such as for example, difluoroboric acid methyl-, ethyl-, -n-propyl-, -i-propyl-, n-butyl, -i-butyl- or tert.-butyl up to -nonyl and -decyl ester are preferably applied.

The reaction of the fluoroboric acid esters with borohydrides is carried out preferably at elevated temperatures, suitably between 40° C. and 200° C. Due to the low reaction temperatures the process according to the invention can be carried out without pressure, but if desired, the operation can also take place under pressure, for example hydrogen pressure.

The use of solvents or suspension agents, for example ethers such as tetrahydrofuran, or hydrocarbons, such as for example, mineral oils with boiling points above the reaction temperatures, or corresponding synthetic mixtures of hydrocarbons, is advantageous but not necessary. Other solvents or suspension agents not reacting with the reaction partners can also be used.

The sodium tetrafluoroborate produced as a by-product according to Equation 1 can be worked up to give the initial products, that is boron trifluoride or fluoroboric acid ester.

The following examples are given for the purpose of illustrating the invention.

Example 1

$3NaBH_4 + 6F_2BOCH_3 \rightarrow 3NaBF_4 + 2B(OCH_3)_3 + 2B_2H_6$ 41.6 g. (1.1 mol) of sodium borohydride are placed into a round bottom flask provided with a stirrer, a reflux condenser, an immersed thermometer, a dropping funnel and a gas-supply pipe. The substance is suspended in 200 ml. of dry tetrahydrofuran and a solution of 159.6 (=2 mol) difluoroboric acid methyl ester in 60 g. tetrahydrofuran are added dropwise within 10 minutes, while stirring and while passing through argon. Subsequently the mixture is heated for about 30 minutes to boiling under reflux in order to drive out the diborane partly dissolved in tetrahydrofuran. For the determination of the yield the gases liberated (argon and diborane are identified by mass spectrography and the infra-red spectrum) are passed into excess triethyl amine; with reference to the difluoroboric acid methyl ester the yield of diborane is practically quantitative.

Example 2

$3NaBH_4 + 6F_2BO\text{-}n\text{-}C_3H_7 \rightarrow 3NaBF_4$
$\phantom{3NaBH_4 + 6F_2BO\text{-}n\text{-}C_3H_7 \rightarrow}+ 2B(O\text{-}n\text{-}C_3H_7)_3 + 2B_2H_6$ Using the experimental arrangement described in Example 1 216 (=2 mol) difluoroboric acid-n-propyl ester are added dropwise to 41.6 g. (=1.1 mol) sodium borohydride which is suspended in 250 ml. of dry tetrahydrofuran while stirring the mixture and passing through argon. The mixture is then heated for a short time to gentle boiling under reflux.

The yield of diborane, determined by absorption in triethyl amine amounts to 90%.

We claim:
1. A process for preparing diborane which comprises reacting a metal borohydride with a fluoro-boric acid alkyl ester wherein alkyl contains from 1–10 carbon atoms, and recovering diborane from the reaction mixture.
2. Process according to claim 1, wherein said fluoroboric acid alkyl ester has the formula $F_2BOR$ and R represents alkyl having 1–10 carbon atoms.
3. Process according to claim 1, wherein said metal borohydride is an alkaline earth metal borohydride.
4. Process according to claim 1, wherein said metal borohydride is an alkali metal borohydride.
5. Process according to claim 1, which comprises effecting said reaction at a temperature of from about 40 to about 200° C.
6. Process according to claim 1, which comprises effecting said reaction in the presence of an inert solvent.
7. Process according to claim 6, wherein said solvent is tetrahydrofuran.
8. Process according to claim 1, wherein said metal borohydride is sodium borohydride and said fluoro-boric acid alkyl ester is difluoro-boric acid methyl ester.

9. Process according to claim 1, wherein said metal borohydride is sodium borohydride and said fluoro-boric acid alkyl ester is difluoro-boric acid-n-propyl ester.

References Cited by the Examiner
FOREIGN PATENTS
823,327  11/1959  Great Britain.

OTHER REFERENCES

Schechter et al., "Boron Hydrides and Related Compounds," prepared by Callery Chemical Co. under contract NOa(s) 10992 for Dept. of Navy, Bureau of Aeronautics, declassified Jan. 5, 1954, pages 19–24.

MAURICE A. BRINDISI, *Primary Examiner.*